United States Patent [19]
Kanda et al.

[11] Patent Number: 5,157,560
[45] Date of Patent: Oct. 20, 1992

[54] DATA RECORDING AND REPRODUCING DEVICE DESIGNED TO REDUCE POWER CONSUMPTION

[75] Inventors: Hiroyuki Kanda; Masahiko Tsunoda; Akitoshi Iwata, all of Oome, Japan

[73] Assignee: Kabushki Kaisha Toshiba, Kawasaki, Japan

[21] Appl. No.: 558,305

[22] Filed: Jul. 26, 1990

[30] Foreign Application Priority Data

Jul. 31, 1989 [JP] Japan .................................. 1-198361

[51] Int. Cl.⁵ ...................... G11B 19/02; G11B 19/20; G11B 19/28
[52] U.S. Cl. ................................ 360/69; 360/73.03; 360/78.04
[58] Field of Search .............. 360/69, 71, 72.1, 74.1, 360/78.04, 75, 73.03

[56] References Cited
U.S. PATENT DOCUMENTS

| | | | |
|---|---|---|---|
| 4,376,293 | 3/1983 | Teramura et al. ..................... | 360/71 |
| 4,691,255 | 9/1987 | Sakai et al. ............................ | 360/69 |
| 4,709,279 | 11/1987 | Sano et al. ............................. | 360/78 |
| 4,736,263 | 4/1988 | Takahashi et al. ..................... | 360/69 |
| 4,737,867 | 4/1988 | Ishikawa et al. ...................... | 360/69 |
| 4,984,103 | 1/1991 | Nigam ..................................... | 360/39 |
| 5,001,578 | 3/1991 | Yamauchi ............................... | 360/69 |

FOREIGN PATENT DOCUMENTS 60-192155 12/1985 Japan .
1-102770 4/1989 Japan .

*Primary Examiner*—John H. Wolff
*Assistant Examiner*—Craig A. Renner
*Attorney, Agent, or Firm*—Finnegan, Henderson, Farabow, Garrett and Dunner

[57] ABSTRACT

A recording and reproducing apparatus having reduced power consumption, wherein a spindle motor drive is stopped during a seek operation while a voice coil motor is driven to move a magnetic head to a destination track on a recording medium. Upon the magnetic head reaching the destination track, the voice coil motor drive is stopped, and the spindle motor is driven.

8 Claims, 6 Drawing Sheets

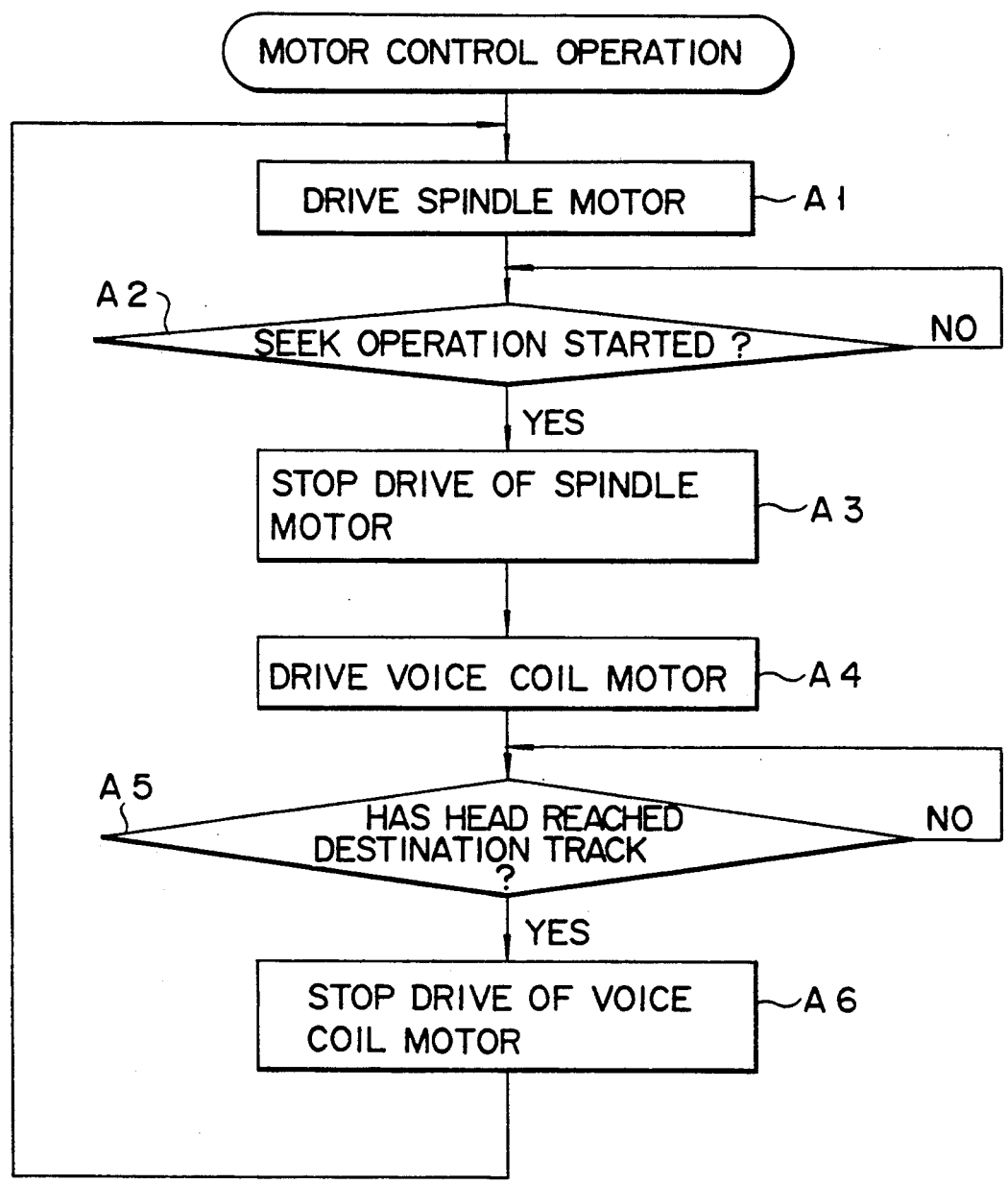
F I G. 2

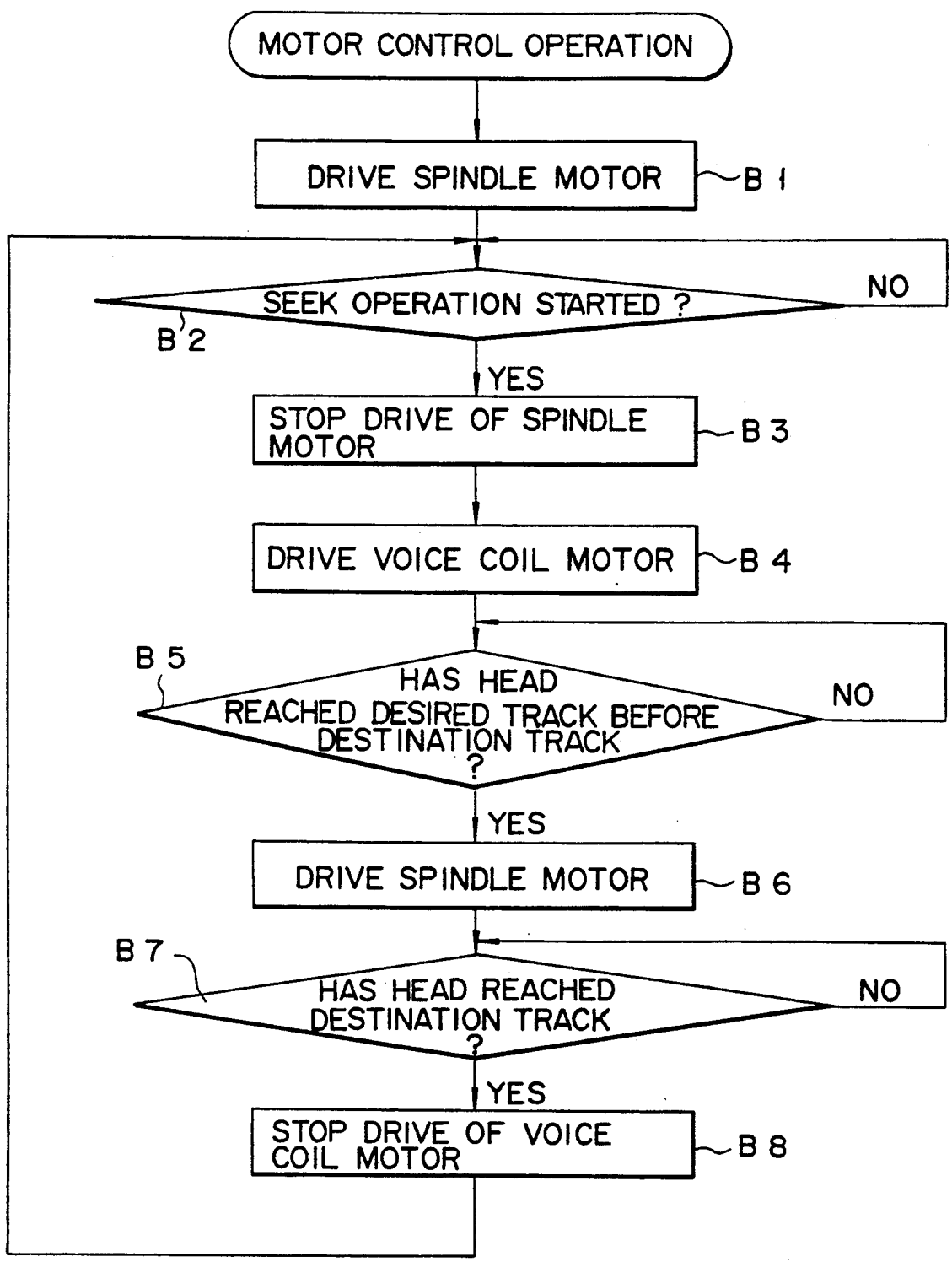
F I G. 4

DATA RECORDING AND REPRODUCING DEVICE DESIGNED TO REDUCE POWER CONSUMPTION

BACKGROUND OF THE INVENTION

1. Field of the Invention

The present invention relates to a data recording and reproducing apparatus having reduced power consumption.

2. Description of the Related Art

In recent years, the number of battery-driven apparatuses such as personal computers has greatly increased, and the demand for reduced power consumption by the magnetic disk drive incorporated in the apparatuses has also increased. The factors determining power consumption by the magnetic disk drive are: the drive current of the spindle motor and the drive current of the voice coil motor. The spindle motor is used to rotate the recording medium, such as a magnetic disk, and is comprised, for example, by a brushless DC motor. The voice coil motor is used to move the magnetic head of the magnetic disk drive in the radial direction of the recording medium.

The spindle motor is controlled such that it rotates at a constant speed when the magnetic disk drive is operated. The voice coil motor is driven only when the magnetic head is moved to a destination track of the recording medium. Hence, when the magnetic head is moved, both the spindle motor and the voice coil motor being simultaneously driven, the magnetic disk drive consumes the most power. As a result, when the magnetic disk drive is incorporated in an apparatus (for example, battery-driven personal computer or word processor) which is particularly sensitive to power consumption demands a problem may arise.

Published Unexamined Japanese Patent Application No. 1-102770 discloses a method of reducing power consumption in a battery-driven apparatus. In this method, operation of the spindle motor is stopped during acceleration and deceleration periods for the magnetic head during seek operations, thereby saving power. The spindle motor is driven only while the magnetic head is in a constant state of velocity, and, thus, the problem of power consumption during acceleration/deceleration periods for the magnetic head is reduced.

In other words, the magnetic head is moved at a desired destination velocity during a constant velocity period. Therefore, a driving current is supplied to a voice coil motor to move the magnetic head at the desired destination velocity during the constant velocity period. However, the power consumed by the supplying drive current during the constant velocity period is not inconsequential. Hence, there remains an unmet demand for a data recording and reproducing apparatus having reduced power consumption.

SUMMARY OF THE INVENTION

It is an object of the present invention to provide a data recording and reproducing apparatus having reduced power consumption.

According to one aspect of the present invention, there is provided a data recording and reproducing apparatus comprising:

a spindle motor for rotating a recording medium in accordance with a first driving current to be supplied;

spindle motor driving means for supplying the first driving current to the spindle motor to drive the spindle motor;

carriage means for mounting at least one head for recording and reproducing data for the recording medium;

carriage moving means for moving the carriage means in accordance with a second driving current to be supplied, to move the head to a desired position on the recording medium;

carriage driving means for supplying the second driving current to the carriage moving means to move the carriage means; and controlling means for stopping a supply of the first driving current to the spindle motor by the spindle motor driving means to stop a drive of the spindle motor during moving the carriage means by the carriage driving means.

According to another aspect of the present invention, there is provided a data recording and reproducing apparatus comprising:

a spindle motor for rotating a recording medium;

spindle motor driving means for driving the spindle motor;

carriage means for mounting at least one head for recording and reproducing data for the recording medium;

carriage moving means for moving the carriage means to move the head to a desired position on the recording medium;

carriage driving means for moving the carriage means; and controlling means for stopping a drive of the spindle motor by the spindle motor driving means during moving the carriage means by the carriage driving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flow chart explaining the motor driving control operation of a first embodiment according to the invention;

FIG. 4 is a flow chart explaining the motor driving control operation of a second embodiment according to the invention.

DETAILED DESCRIPTION OF THE PREFERRED EMBODIMENTS

An embodiment of the present invention will now be described with reference to the accompanying drawings.

Figure 1:
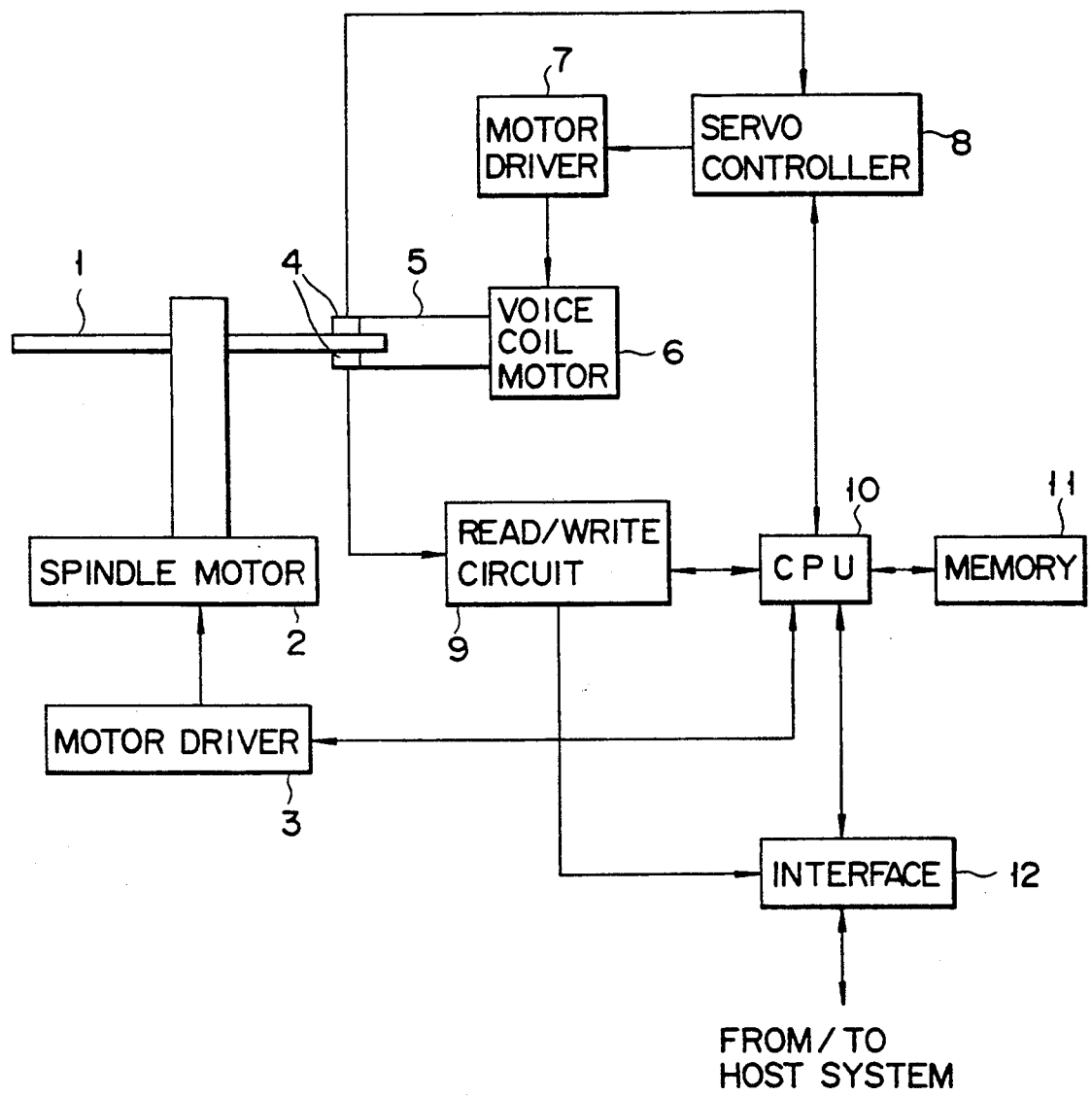
FIG. 1 is a block diagram showing an embodiment system according to this invention.

In FIG. 1, the illustrative embodiment of the present system comprises a recording medium 1, a spindle motor 2, a motor driver 3, a magnetic head 4, a carriage 5, a voice coil motor 6, a motor driver 7, a servo controller 8, a read/write circuit 9, a CPU (Central Processing Unit) 10, a memory 11, and an interface 12.

The spindle motor 2 is, for example, a brushless DC (Direct Current) motor, and is used to rotate the recording medium 1 such as a hard disk.

The motor driver 3 supplies a driving current to the spindle motor 2.

The magnetic head 4 mounted to one of the carriage 5 (described later) moves over the recording medium 1 upon being driven by the voice coil motor 6 and is positioned at a desired data track on the recording medium 1, thereby performing data read/write for the positioned data track. Servo data for positioning magnetic head 4 is stored previously on the recording medium 1. The servo data is read out by magnetic head 4 and input to servo controller 8.

The servo controller 8 performs the positioning control of magnetic head 4 in accordance with the servo data read out by magnetic head 4. That is, servo controller 8 outputs a control signal for positioning control of the magnetic head 4 to motor driver 7.

The read/write circuit 9 processes the reproduction signal read out from the recording medium 1 and the data written into the recording medium 1.

The motor driver 7 supplies a driving current corresponding to the control signal from the servo controller 8 to voice coil motor 6.

The voice coil motor 6 is driven in accordance with the driving current from motor driver 7 to move magnetic head 4 over recording medium 1.

One end of carriage 5 mounts magnetic head 4 via a head arm and suspension, not shown, and the other end of carriage 5 mounts a voice coil forming part of the voice coil motor 6. A center portion of the carriage 5 can be rotated about a center axis. The carriage 5 is rotated about the center axis by driving voice coil motor 6 to move magnetic head 4 to a destination data track on recording medium 1, and is used to position magnetic head 4 in the destination data track.

The CPU 10 controls motor driver 3, servo controller 8, and read/write circuit 9, accesses memory 11, and supplies various signals to, and receives various signals from, a host system (not shown).

The memory 11 stores the data representing a destination velocity curve during the seek operation period of magnetic head 4, the data representing a desired track corresponding to a driving start position of spindle motor 2 in the second embodiment motor driving control (described later), and the like.

The interface 12 supplies various signals from the host system to CPU 10, and also supplies various signals from CPU 10 to the host system.

A first embodiment of the motor driving control system which constitutes the present invention will be explained with reference to the flow chart shown in FIG. 2.

When the present system shown in FIG. 1 is operated, in step A1, spindle motor 2 is driven so as to rotate the recording medium 1 at a constant speed.

In step A2, it is determined whether or not a seek operation for moving magnetic head 4 to a destination track has been started. If YES, spindle motion drive is stopped (step A3). The voice coil motor is driven to move magnetic head 4 over the recording medium 1 by means of carriage 5 (step A4).

In step A5, it is determined whether or not magnetic head 4 has reached the destination track, that is, whether the seek operation has been completed. If YES, voice coil motor drive is stopped (step A6), and spindle motor 2 is driven (step A1). In practice as later described, however, voice coil motor 6 is driven even after the seek operation is completed.

As described above, during movement of magnetic head 4 to the destination track of recording medium 1, that is, during the seek operation period, the drive of spindle motor 2 is stopped. For example, even if a seek operation is very long, magnetic head 4 can reach the destination track during the time in which recording medium 1 rotates 360 degrees. Therefore, when the drive of spindle motor 2 is stopped, a desired degree of flying for the magnetic head 4 can nevertheless be obtained.

Figure 3A:
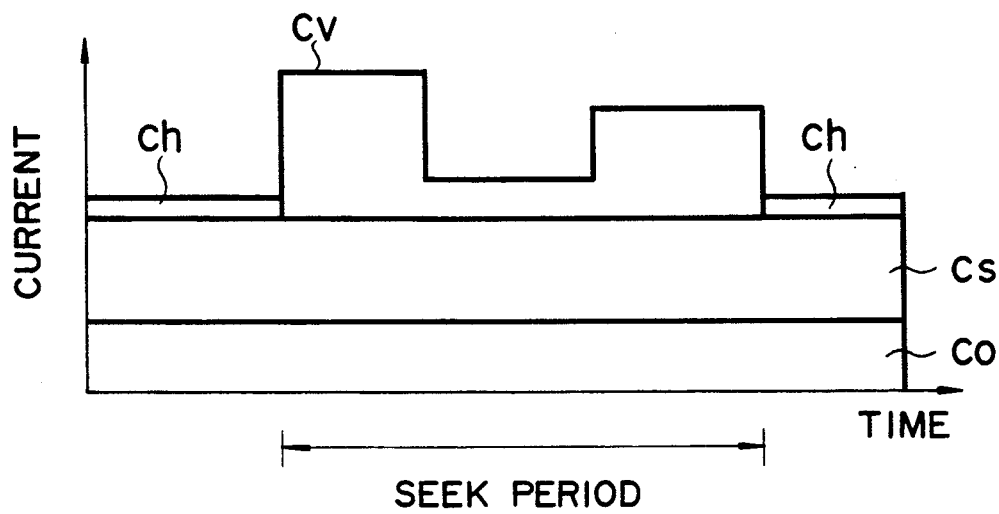
FIGS. 3A and 3B are diagrams representing the changes in the total supply current in a conventional operation and the first embodiment operation.
Figure 3B:
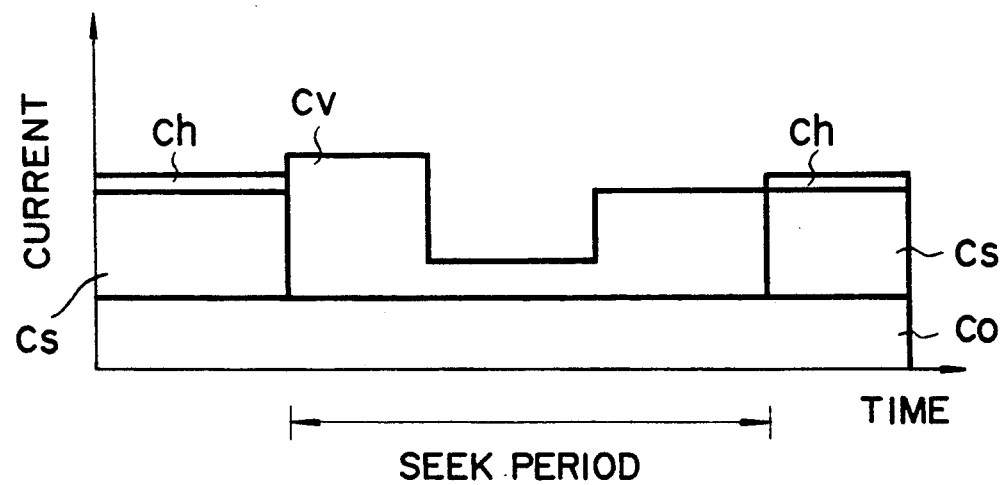

With reference to FIGS. 3A and 3B, the total current supplied during operation of the first embodiment motor driving control system will be compared with that in the conventional control system. In FIGS. 3A and 3B, Cv is the current supplied to voice coil motor 6, Cs is the current supplied to spindle motor 2, Co is the current supplied to components excluding voice coil motor 6 and spindle motor 2, and Ch is the hold current for positioning magnetic head 4 at the center of the destination track of recording medium 1. The voice coil motor 6 need not be driven once magnetic head 4 has been positioned at the destination track. In practice, however, as magnetic head 4 is flying and unstable, voice coil motor 6 is driven even after the positioning of magnetic head 4, thereby to hold magnetic head 4 at the center of the destination track. In the conventional control system, as the voice coil motor and the spindle motor are both driven during the seek operation period, the total current supplied changes as shown in FIG. 3A. In the first embodiment control shown in FIG. 2, the drive of spindle motor 2 is stopped during the seek operation period. Therefore, as can be seen from FIG. 3B, the total current supplied during operation of the first embodiment control system is less than that in the conventional control system. Hence, in the first embodiment of the present invention, power consumption is reduced in comparison with the conventional system, particularly power consumption during the seek operation period. The present invention is thus particularly suitable for use in a magnetic disk drive incorporated into a battery-driven apparatus such as a personal computer or a word processor.

A second embodiment of the motor driving control system which constitutes the present invention will be explained with reference to the flow chart shown in FIG. 4.

When the present system shown in FIG. 1 is operated, in step B1, spindle motor 2 is driven to rotate the recording medium 1 at the constant speed.

In step B2, it is determined whether or not the seek operation for moving magnetic head 4 to a destination track has been started. If YES, spindle motor drive is stopped (step B3). The voice coil motor is driven to move magnetic head 4 over the recording medium 1 by means of carriage 5 (step B4).

In step B5, it is determined whether or not magnetic head 4 has reached a desired track before the destination track. The data representing the desired track is stored previously in memory 11. The desired track is determined on the basis of the destination velocity curve during the seek operation period of magnetic head 4. If YES in step B5, spindle motor 2 is driven (step B6).

In step B7, it is determined whether or not magnetic head 4 has reached the destination track, that is, whether the seek operation has been completed. If YES, voice coil motor drive is stopped (step B8), and it is determined whether or not a seek operation has been started (step B2).

As described above, in the second embodiment motor driving control system, spindle motor 2 is driven before the drive of voice coil motor 6 is stopped. The reason for doing so is as follows: when an environmental influence such as a shock is generated during operation of the present system, particularly during a seek operation of magnetic head 4, since the spindle motor is not driven during the seek operation in the first embodiment, the recording medium is vibrated. Therefore, rotation of the recording medium by inertia is affected by the vibration, thereby decreasing the rotation of the recording medium. According to the second embodiment, however, decreased rotation of the recording medium by an environmental influence can be prevented.

With reference to FIGS. 5A to 5F, the total current supplied in the second embodiment motor driving control system will be compared with that in the conventional control system. In FIGS. 5A, 5B, 5D to 5F, T1, T2, and T3 are respectively an acceleration period, constant-velocity period and deceleration period occurring during a seek operation period for magnetic head 4.

Figure 5A:
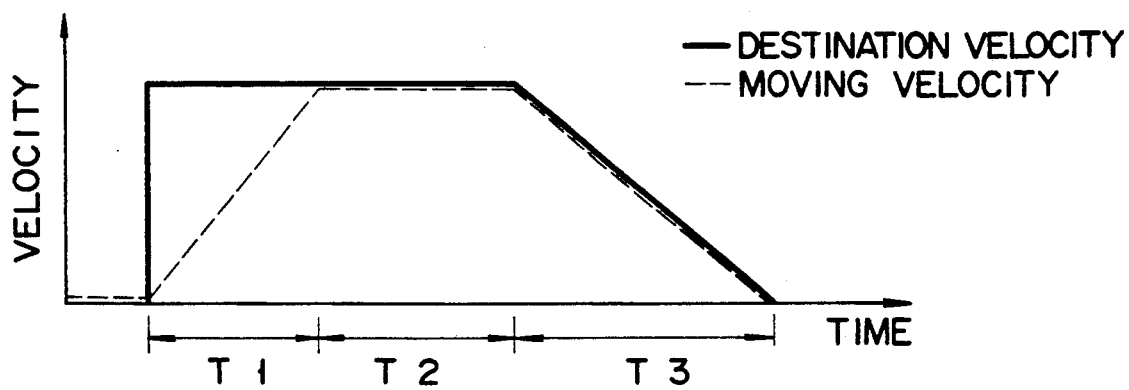
FIGS. 5A and 5F are diagrams illustrating the changes in the supply current in the conventional operation and the second embodiment operation.
Figure 5B:
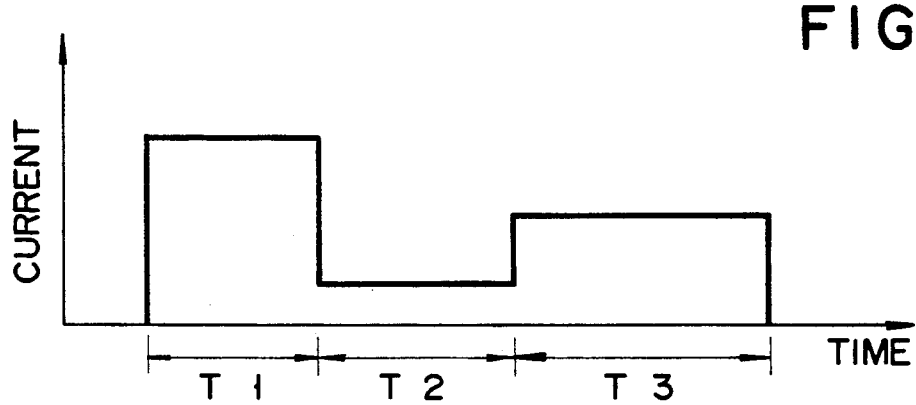

During data read/write operation, CPU 10 controls voice coil motor 6 on the basis of data representing the destination velocity curve (solid-line) shown in FIG. 5A. In practice, however, magnetic head 4 is moved in the moving velocity curve (broken-line) shown in FIG. 5A. Thus, as can be seen from FIG. 5B, the current supplied to voice coil motor 6 is large during acceleration period T1 and deceleration period T3 of magnetics head 4.

Figure 5C:
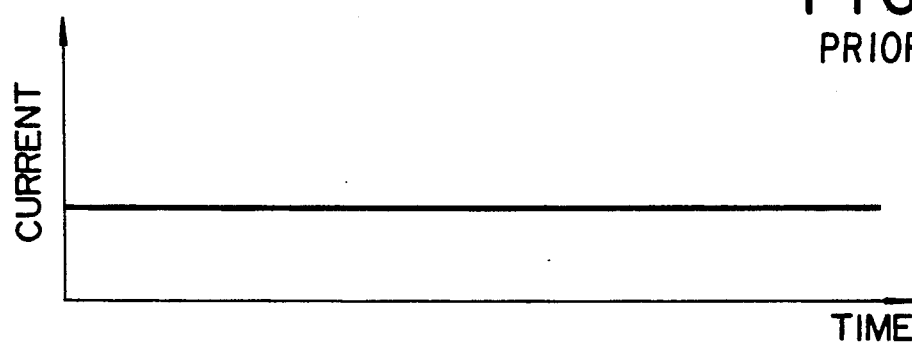
Figure 5D:
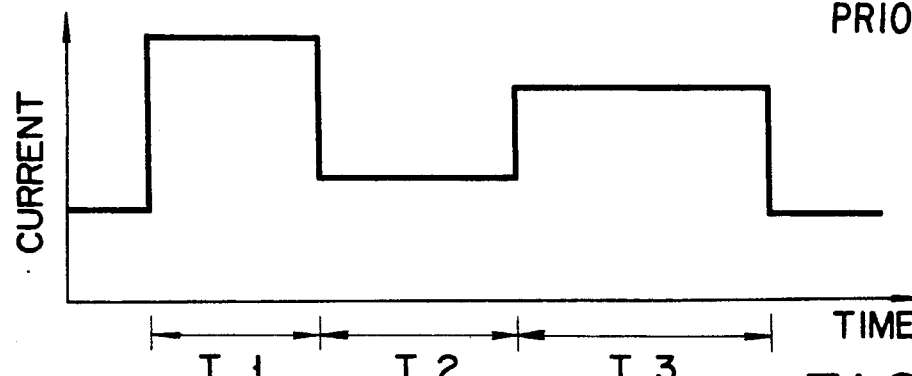

In the conventional control system, as the recording medium 1 is rotated at a constant speed, a current supplied to spindle motor 2 is constant as shown in FIG. 5C. Therefore, the total current supplied to each motor is large during the seek operation period, in particular, during acceleration period T1 and deceleration period T3 (see FIG. 5D).

Figure 5E:
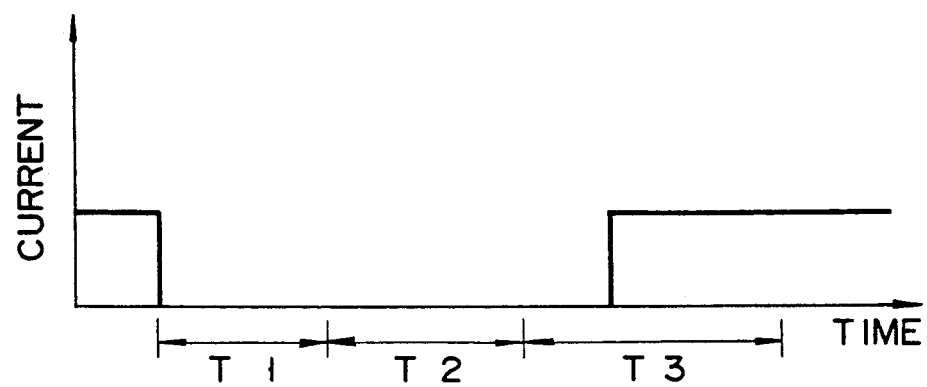
Figure 5F:
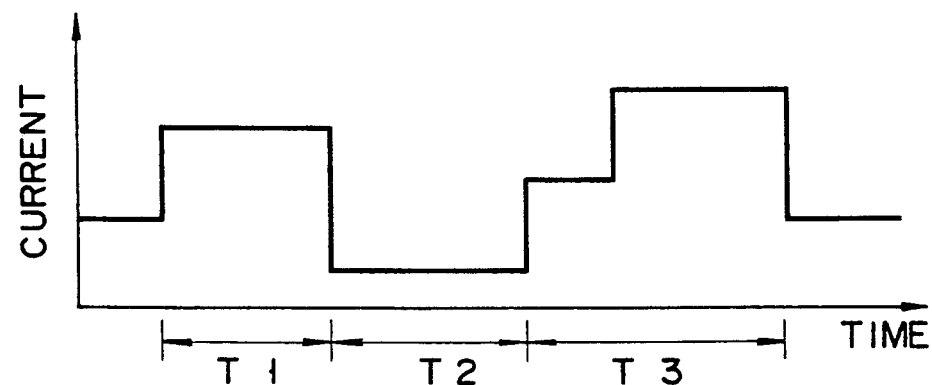

In the second embodiment motor driving control system, the drive of spindle motor 2 is stopped until a desired time during the deceleration period from the acceleration period of magnetic head 4, and spindle motor 2 is driven from the desired time of the deceleration period. That is, current supplied to spindle motor 2 changes as shown in FIG. 5E. A drive stop period for spindle motor 2 must be set to rotate recording medium 1 a normal number of rotations after the seek operation is completed, in order to start a data read/write operation immediately. Therefore, the total current supplied to each motor changes as shown in FIG. 5F, thereby reducing power consumption in comparison with the conventional system.

In the second embodiment motor driving control, as described above, the drive of spindle motor 2 is stopped until a desired time during the deceleration period from the acceleration period of magnetic head 4. However, the total supply current is greater during the acceleration period. Accordingly, even if the drive of the spindle motor is stopped during the acceleration period of the magnetic head, power consumption can be reduced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data recording and reproducing apparatus comprising:
   a spindle motor for rotating a recording medium in accordance with a first driving current;
   spindle motor driving means for supplying the first driving current to the spindle motor;
   carriage means for mounting at least one head for recording data on and reproducing data from the recording medium;
   carriage moving means for moving the carriage means in accordance with a second driving current, such that the head is moved to a predetermined destination position over the recording medium;
   supply means for supplying the second driving current to the carriage moving means; and
   controlling means for stopping a supply of the first driving current to the spindle motor from the spindle motor driving means so as to stop a drive of the spindle motor during movement of the carriage means towards the predetermined destination position by the carriage moving means.

2. The apparatus according to claim 1, wherein the controlling means is adapted to stop supplying the first driving current to the spindle motor until the head reaches the predetermined destination position over the recording medium.

3. The apparatus according to claim 1, wherein the controlling means is adapted to activate the spindle motor to rotate the recording medium before the head reaches the predetermined destination position over the recording medium.

4. The apparatus according to claim 3, wherein the controlling means is adapted to activate the spindle motor during a deceleration period of the carriage means.

5. A data recording and reproducing apparatus comprising:
   a spindle motor for rotating a recording medium;
   a spindle motor driving means for driving the spindle motor to rotate the recording medium;
   carriage means for mounting at least one head for recording data on and reproducing data from the recording medium;
   carriage moving means for moving the carriage means, to move the head to a predetermined destination position over the recording medium; and
   controlling means for causing the spindle motor driving means to stop a drive of the spindle motor during movement of the carriage means towards the predetermined destination position by the carriage moving means.

6. The apparatus according to claim 5, wherein the controlling means is adapted to stop the spindle motor driving means until the head reaches the predetermined destination position over the recording medium.

7. The apparatus according to claim 5, wherein the controlling means is adapted to activate the spindle motor to rotate the recording medium before the head reaches the predetermined destination position over the recording medium.

8. The apparatus according to claim 7, wherein the controlling means is adapted to activate the spindle motor during a deceleration period of the carriage means.

* * * * *